(12) United States Patent
Pilpel et al.

(10) Patent No.: US 10,068,022 B2
(45) Date of Patent: Sep. 4, 2018

(54) IDENTIFYING TOPICAL ENTITIES

(75) Inventors: Haran Pilpel, Ramat Hasharon (IL);
Tomer Shmiel, Ramat-Gan (IL); Eran Ofek, Rehovot (IL); Eldad Barkai, Givat-Shmuel (IL); Ziv Bar-Yossef, Herzliya (IL)

(73) Assignee: Google LLC, Mountain View, CA (US)

( * ) Notice: Subject to any disclaimer, the term of this patent is extended or adjusted under 35 U.S.C. 154(b) by 310 days.

(21) Appl. No.: 13/153,365

(22) Filed: Jun. 3, 2011

(65) Prior Publication Data

US 2015/0278366 A1    Oct. 1, 2015

(51) Int. Cl.
*G06F 17/30* (2006.01)

(52) U.S. Cl.
CPC .. *G06F 17/30867* (2013.01); *G06F 17/30958* (2013.01)

(58) Field of Classification Search
CPC ............... G06F 17/30867; G06F 17/30958
USPC .................................................. 707/720–725
See application file for complete search history.

(56) References Cited

U.S. PATENT DOCUMENTS

| | | | |
|---|---|---|---|
| 6,556,983 B1 | 4/2003 | Altschuler et al. | |
| 6,711,585 B1 | 3/2004 | Copperman et al. | |
| 6,732,088 B1 * | 5/2004 | Glance | G06F 17/30864 |
| 6,983,320 B1 * | 1/2006 | Thomas et al. | 709/224 |
| 7,013,323 B1 * | 3/2006 | Thomas et al. | 709/203 |
| 7,051,023 B2 * | 5/2006 | Kapur | G06F 17/30672 704/9 |
| 7,565,630 B1 * | 7/2009 | Kamvar | G06F 17/30867 |
| 7,620,628 B2 * | 11/2009 | Kapur et al. | |
| 7,747,613 B2 * | 6/2010 | Freeman | G06F 17/30864 707/707 |
| 8,229,883 B2 | 7/2012 | Brauer et al. | |
| 8,407,217 B1 * | 3/2013 | Zhang | G06F 17/28 707/708 |
| 8,452,798 B2 * | 5/2013 | Myaeng | G06F 17/30672 707/768 |
| 8,843,476 B1 * | 9/2014 | Zhang | G06F 17/30719 707/723 |
| 9,213,745 B1 * | 12/2015 | Benitez | G06F 17/3053 |
| 2004/0186827 A1 * | 9/2004 | Anick et al. | 707/3 |
| 2005/0080613 A1 | 4/2005 | Colledge et al. | |
| 2005/0216434 A1 * | 9/2005 | Haveliwala | G06F 17/30867 |
| 2006/0010126 A1 * | 1/2006 | Anick et al. | 707/4 |
| 2007/0043706 A1 * | 2/2007 | Burke et al. | 707/3 |
| 2007/0043761 A1 * | 2/2007 | Chim | G06F 17/30643 |
| 2007/0088692 A1 * | 4/2007 | Dean | G06F 17/30864 |

(Continued)

*Primary Examiner* — Mark D Featherstone
*Assistant Examiner* — Navneet Gmahl
(74) *Attorney, Agent, or Firm* — Fish & Richardson P.C.

(57) ABSTRACT

Methods, systems, and apparatus, including computer programs encoded on a computer storage medium, for identifying topical entities. In one aspect, a method includes obtaining a plurality of entities that are associated with a first resource; for one or more of the identified entities, receiving search results for a search query derived from the entity; determining that search results for a search query including a particular entity include a specific type of search results; and determining that the particular entity is a topical entity of the first resource based at least in part on the particular entity appearing in a title or a resource locator of the first resource, wherein the topical entity of the first resource represents a predominant topic of the first resource.

12 Claims, 12 Drawing Sheets

(56) References Cited

U.S. PATENT DOCUMENTS

| | | |
|---|---|---|
| 2007/0150457 A1* | 6/2007 | Goldman ........... G06F 17/30716 |
| 2008/0091670 A1 | 4/2008 | Ismalon |
| 2008/0140643 A1* | 6/2008 | Ismalon ............................ 707/5 |
| 2008/0183695 A1 | 7/2008 | Jadhav |
| 2009/0234832 A1 | 9/2009 | Gao et al. |
| 2009/0313217 A1* | 12/2009 | Signorini et al. ................. 707/3 |
| 2009/0319484 A1* | 12/2009 | Golbandi ............. G06F 17/3089 |
| 2009/0327264 A1* | 12/2009 | Yu ...................... G06F 17/30864 |
| 2010/0049770 A1* | 2/2010 | Ismalon ............ G06F 17/30646 707/765 |
| 2010/0169300 A1* | 7/2010 | Liu .................... G06F 17/30864 707/709 |
| 2010/0250598 A1 | 9/2010 | Brauer et al. |
| 2011/0040766 A1 | 2/2011 | Robinson et al. |
| 2011/0072025 A1* | 3/2011 | Van Zwol ......... G06F 17/30265 707/750 |
| 2011/0231383 A1 | 9/2011 | Smyth et al. |
| 2011/0252032 A1 | 10/2011 | Fitzgerald et al. |
| 2011/0252060 A1* | 10/2011 | Broman ............ G06F 17/30899 707/771 |
| 2011/0320441 A1* | 12/2011 | Lee et al. ....................... 707/723 |
| 2012/0137367 A1 | 5/2012 | Dupont et al. |
| 2012/0158685 A1* | 6/2012 | White ............... G06F 17/30867 707/706 |
| 2012/0240236 A1* | 9/2012 | Wyatt et al. ...................... 726/25 |
| 2012/0290950 A1* | 11/2012 | Rapaport et al. ............. 715/753 |
| 2012/0296743 A1* | 11/2012 | Velipasaoglu .... G06F 17/30867 705/14.54 |
| 2013/0198240 A1* | 8/2013 | Ameri-Yahia ......... G06Q 30/02 707/798 |
| 2014/0108376 A1* | 4/2014 | Batali ............... G06F 17/30867 707/708 |

\* cited by examiner

FIG. 12

IDENTIFYING TOPICAL ENTITIES

BACKGROUND

This specification relates to digital data processing and, in particular, to search systems.

Internet search engines provide information about Internet accessible resources (e.g., Web pages, images, text documents, multimedia content) that are responsive to a user's search query by returning a set of search results in response to the query. A search result includes, for example, a Uniform Resource Locator (URL) and a snippet of information for resources responsive to a query. The search results can be ranked (e.g., in an order) according to scores assigned to the search results.

SUMMARY

In general, one aspect of the subject matter described in this specification can be embodied in methods that include the actions of obtaining a plurality of entities that are associated with a first resource; for one or more of the identified entities, receiving search results for a search query derived from the entity; determining that search results for a search query including a particular entity include a specific type of search results; and determining that the particular entity is a topical entity of the first resource based at least in part on the particular entity appearing in a title or a resource locator of the first resource, wherein the topical entity of the first resource represents a predominant topic of the first resource. Other embodiments of this aspect include corresponding systems, apparatus, and computer programs, configured to perform the actions of the methods, encoded on computer storage devices.

These and other embodiments can each optionally include one or more of the following features. An entity can be a word or phrase that represents a concept or topic. The specific type of search results can be one of: shopping results, map results, or an answer box.

The method can further include determining that the first resource does not appear beyond a specified number in an order of search results for any of the search queries derived from the identified entities. The method can further include determining that a log of previously submitted queries that resulted in a request for the first resource does not indicate that any of the identified entities are the topical entity. Determining that the log of previously submitted queries does not indicate that any of the identified entities are the topical entity can include: determining that each identified entity is responsible for a proportion of requests for the first resource that does not exceed a threshold proportion. Determining that the log of previously submitted queries does not indicate that any of the identified entities are the topical entity can include: determining that the log of previously submitted queries contains less than a threshold number of previously submitted queries that resulted in a request for the first resource. The predominant topic of the first resource can describe more than a threshold proportion of content of the first resource.

Particular embodiments of the subject matter described in this specification can be implemented so as to realize one or more of the following advantages. From entities that are determined from a resource, the entities that represent main topics of the resource can be identified and entities that represent peripheral topics can be discarded. The topical entity of a resource that is directed to one topic can be identified. From entities that are determined from a resource, any entities that are predominantly used in a different context than that of the resource can be identified. Additionally, the identified entities can be modified by generating a combined entity so that their scope is limited to the topics related to the resource. A user's web browsing experience can be enhanced by providing additional content that is interesting and is relevant to resources that are being presented to the user. Additionally, because the additional content is generated using only entities that represent main topics of the resources, the additional content's relevance to the first resource and value to the user can be improved. For example, depending on the resource being presented to the user, the additional content can include one or more of related video content, news content, image content, web pages, price comparison, map content, business listing content, and so on. Because the additional content can contain multiple types of content, the user's web browsing experience can be improved. Furthermore, the additional content for a particular user can be adjusted based on the particular user's browsing history. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 12 illustrates an example user interface where content relevant to a resource about a museum is being presented.

Like reference numbers and designations in the various drawings indicate like elements.

DETAILED DESCRIPTION

Figure 1:
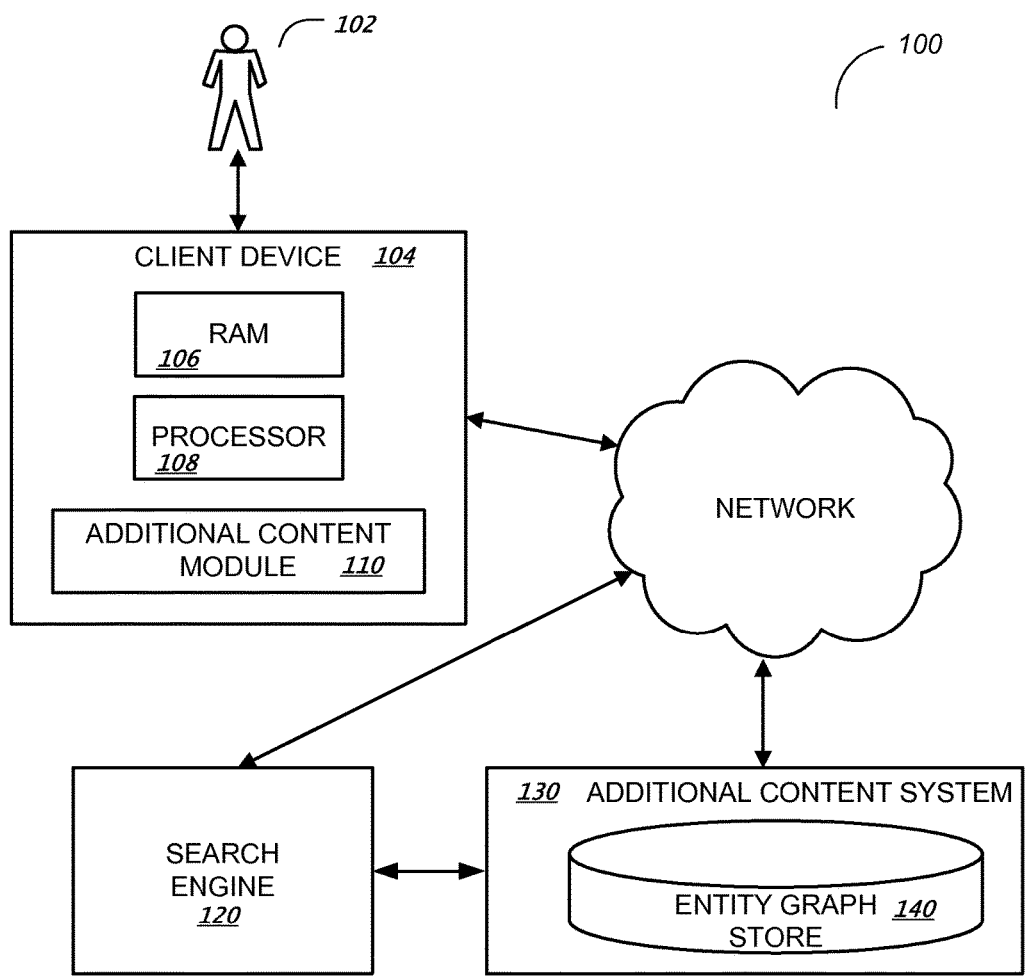
FIG. 1 is a block diagram of an example system for presenting additional content to users of client devices.

FIG. 1 is a block diagram of an example system 100 for presenting additional content to users of client devices. The system 100 includes an additional content system 130 that is implemented by one or more data processing apparatus in one or more geographic locations. The additional content system 130 will be described further below. A user 102 can interact with the additional content system 130 through a client device 104. For example, the client device 104 can be a data processing apparatus coupled to the additional content system 130 through a local area network (LAN) or wide area network (WAN), e.g., the Internet. The client device 104 will generally include a random access memory (RAM) 106 and a processor 108. The client device 104 will also generally include a user software application, e.g., a web browser or other communication software, to facilitate the sending and receiving of data over the network.

The user 102 can use the web browser or other communication software to interact with resources that are provided over the network. Resources that are provided over the network are each associated with a resource address and can include, for example, HyperTextMarkup Language (HTML) pages, word processing documents, portable document format (PDF) documents, images, video, and feed sources. The resources include content, such as words, phrases, pictures, and so on, and may include embedded information (such as meta information and hyperlinks) and/or embedded instructions (such as JAVASCRIPT scripts).

In some implementations, the client device 104 also includes an additional content software module 110. The additional content software module 110 can be implemented as a web browser add-on, e.g., a plug-in or an extension to a web browser, on the client device 104, for example. Alternatively, the functionality of the additional content software module 110 can be integrated into a web browser or other communication software included in the client device 104. In general, the additional content software module 110 transmits data identifying a resource, e.g., a URL, being presented to the user 102 in a web browser over the network to the additional content system 130, receives additional content relevant to the resource generated by the additional content system 130, and presents the additional content to the user in conjunction with the currently presented resource. The presented additional content can include images and videos related to the currently presented resource, links to and descriptions of web pages relevant to the currently presented resource, and so on. When appropriate, the additional content can also include map information for a place referred to in the current resource or shopping results for a consumer product referred to in the current resource. When the user 102 navigates to another resource, the additional content software module 110 can transmit data identifying the other resource to the additional content system 130 and receive and present additional content that corresponds to the other resource. An example web browser add-on is described in more detail below with reference to FIG. 10, FIG. 11, and FIG. 12.

The system 100 also includes a search engine 120 that is implemented on one or more data processing apparatus in one or more locations and provides search results responsive to received search queries. For example, in response to a search query received from the client device 104, the search engine 120 uses a resource index to identify resources that are relevant to the queries. The search engine 120 generates search results that identify the relevant resources and returns the search results to the client device 104. The search engine 120 ranks the search results, i.e., places the search results in an order, according to respective scores associated with each search result. The scores are generated using a scoring function and generally relate to both the quality and the relevance of the resource corresponding to each search result. After the search results are ranked, the search engine 120 returns the search results according to the ranking.

Using the search engine 120, the additional content system 130 generates additional content that is relevant to resources currently being presented to users of client devices. In general, the additional content system 130 receives data identifying a resource currently being presented in a graphical user interface of the client device 104, identifies one or more entities that are central to the resource, and identifies resources that are relevant to those central entities using the search engine 120. The additional content system 130 then generates additional content based on the identified resources, and transmits the additional content over the network to the client device 104 for presentation in the graphical user interface. An entity can be a word or phrase, e.g., representing a concept or topic. As particular examples, entities associated with Michael Jordan the basketball player may include "Michael Jordan," "Michael," "Jordan," "basketball," "National Basketball Association," "NBA," "Chicago Bulls," and so on. Entities that are central to a resource (central entities) are entities that represent one or more main topics of the resource. For example, for an article in an online encyclopedia about Michael Jordan, the associated entities may include the above entities, but may also include entities that are not related to Michael Jordan, e.g., entities that relate to the encyclopedia ("wikipedia"), entities that relate to authors of books about Michael Jordan ("Sam Smith"), and so on. Because the topics represented by these entities are not main topics of the resource, the additional content system 130 would not recognize them as central entities for the resource. A user viewing an article about Michael Jordan may not desire to view additional content related to the online encyclopedia or about authors of books about Michael Jordan, and these entities would therefore not be used by the additional content system 130 in generating additional content that relates to the resource.

The additional content system 130 includes or can communicate with an entity graph store 140. The entity graph store 140 can be one or more data stores that store an entity graph compiled from information about entities that are associated with resources in a collection of resources. The collection of resources can be, for example, resources that have been indexed by the search engine 120. The entity graph can include a respective node for each entity that is associated with at least one resource in the collection of resources. Entities can be associated with a resource if they occur in the content of the resource, are extracted or gathered from the resource by conventional or other techniques, and so on. If two entities are frequently associated with the same resource in the collection, the nodes corresponding to those entities in the entity graph are connected with an edge. In particular, two nodes are connected with an edge if the two entities represented by the nodes are associated with the same resource in the collection more frequently than would be expected if the two entities were unrelated or independent. For example, the nodes representing the entities "michael jordan" and "basketball" may be connected by an edge in the entity graph because the probability of both entities being associated with the same resource in the collection more than a threshold amount higher than it would be if the entity "michael jordan" did not have any relation to the entity "basketball."

The edges can be weighted so that, for example, the more times two entities are associated with the same resource, the greater the weight of the edge between the two nodes corresponding to the two entities. An example entity graph is described in more detail below, with reference to FIG. 2.

In order to generate additional content, the additional content system 130 selects central entities from entities that are associated with a resource. In some circumstances, before generating the additional content, the system may determine, using search engine 120, whether any of the central entities is the topical entity of the resource, e.g., whether any of the entities represent the predominant topic of the resource. A topic can be a predominant topic of a resource if, for example, the topic describes more than a threshold proportion of the content included in the resource. Identifying topical entities will be described in more detail below, with reference to FIG. 6. Additionally, the system may use the search engine 120 to determine whether any of the central entities are ambiguous, e.g., whether search queries that include any of the central entities tend to return search results that are not sufficiently related to the topic(s) of the resource because the central entity is predominately used in a different context. Identifying ambiguous entities will be described in more detail below with reference to FIG. 7 and FIG. 8.

Figure 2:
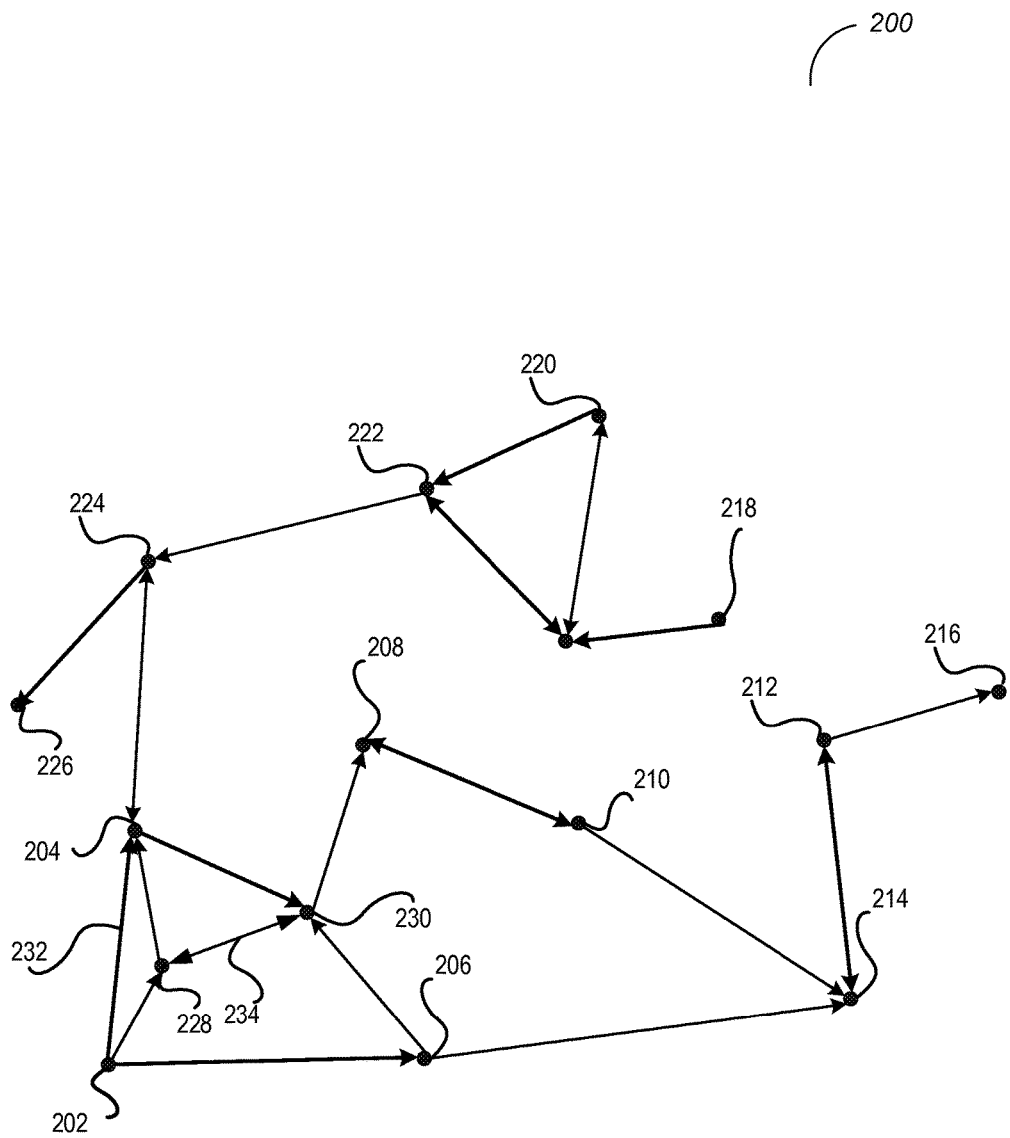
FIG. 2 is an example entity graph compiled from information about entities that are associated with resources in a collection of resources.

FIG. 2 illustrates an example entity graph 200 compiled from information about entities that are associated with resources in a collection of resources. The entity graph 200 is an example of an entity graph that can be stored in entity graph store 140. Nodes 202, 204, 206, 208, 210, 212, 214, 216, 218, 220, 222, 224, 226, 228, and 230 each represent distinct entities associated with resources in the collection of resources. Nodes in the entity graph 200 are connected to other nodes in the graph by edges. For example, nodes 202 and 204 are connected by an edge 232 that signifies that the entities represented by nodes 202 and 204 are frequently associated with the same resource. In some implementations, a node representing an entity A and a node representing an entity B are connected with an edge in the entity graph 200 if:

$$\frac{\frac{freq(A, B)}{N}}{\frac{freq(A)}{N} * \frac{freq(B)}{N}} \geq k$$

where freq(A,B) is the number of times entity A and entity B are associated with the same resource in the collection of resources, freq(A) is the number of times entity A is associated with a resource in the collection of resources, freq(B) is the number of times entity B is associated with a resource in the collection of resources, N is the number of resources in the collection, and k is a specified threshold value greater than one. Thus, the nodes are connected by an edge only if the probability of entity A and entity B being associated with the same resource in the collection sufficiently exceeds the probability that entity A and entity B would be associated with the same resource if they were independent.

Edges in the entity graph 200 can be weighted so that edges between nodes that represent entities that are highly related, e.g., are frequently associated with the same resource, have a greater weight than edges between nodes that represent entities that are not frequently associated with the same resource. The weight of an edge between a pair of nodes can be computed using a pointwise mutual information (PMI) measure that determines how related two entities are based on how often each entity is associated with resources in the collection of resources and how often the two entities are associated with the same resource. In some implementations, the weight $W_{AB}$ of an edge between a node representing an entity A and a node representing entity B is:

$$W_{AB}=\log\ [prob(A,B)/(prob(A)*prob(B))]$$

where prob(A,B)=freq(A,B)/N, prob(A)=freq(A)/N, and prob(B)=freq(B)/N. If entity A and entity B are independent, the weight of the edge will be zero, and there will be no edge between the nodes representing entity A and entity B in the entity graph.

Additionally, each edge in the entity graph 200 is a directed edge. For example, the edge 232 is directed from node 202 to node 204, e.g., it is an outgoing edge of node 202. By contrast, the edge 234 is outgoing from both node 228 and node 230. The direction of the edge between a node representing entity A and a node representing entity B is based on how frequently the two entities are associated with the same resource in the collection of resources. For example, when the entity "Omri Casspi" is associated with a resource, the entity "NBA" is likely also associated with the resource, since Omri Casspi is a basketball player in the NBA. However, the converse is likely not true. The NBA has many players (and other associated entities), so that when "NBA" is associated with a resource, it is not likely that "Omri Casspi" will also be associated with the resource. Thus, an edge in the entity graph between a node representing "Omri Casspi" and a node representing "NBA" is likely to be outgoing from the node representing "Omri Casspi" to the node representing "NBA." In some implementations, the edge between node A representing entity A and node B representing entity B is considered to be outgoing from node A to node B if entity A is above a specified threshold, e.g., in the top 100, in an order of entities that are associated with the same resource as entity B. The entities can be ordered based on the number of times the entity is associated with the same resource as entity B. For example, for the link between nodes representing "Omri Casspi" and "NBA," "NBA" is likely to be very high, e.g., in the top 100, in an order of entities that are associated with the same resource as "Omri Casspi." However, "Omri Casspi" would not be high, e.g., not in the top 100, in an order of entities that are associated with the same resource as "NBA." Thus, the edge between two nodes representing these entities would be outgoing from "Omri Casspi" to "NBA" but would not be outgoing from "NBA" to "Omri Casspi."

Figure 3:
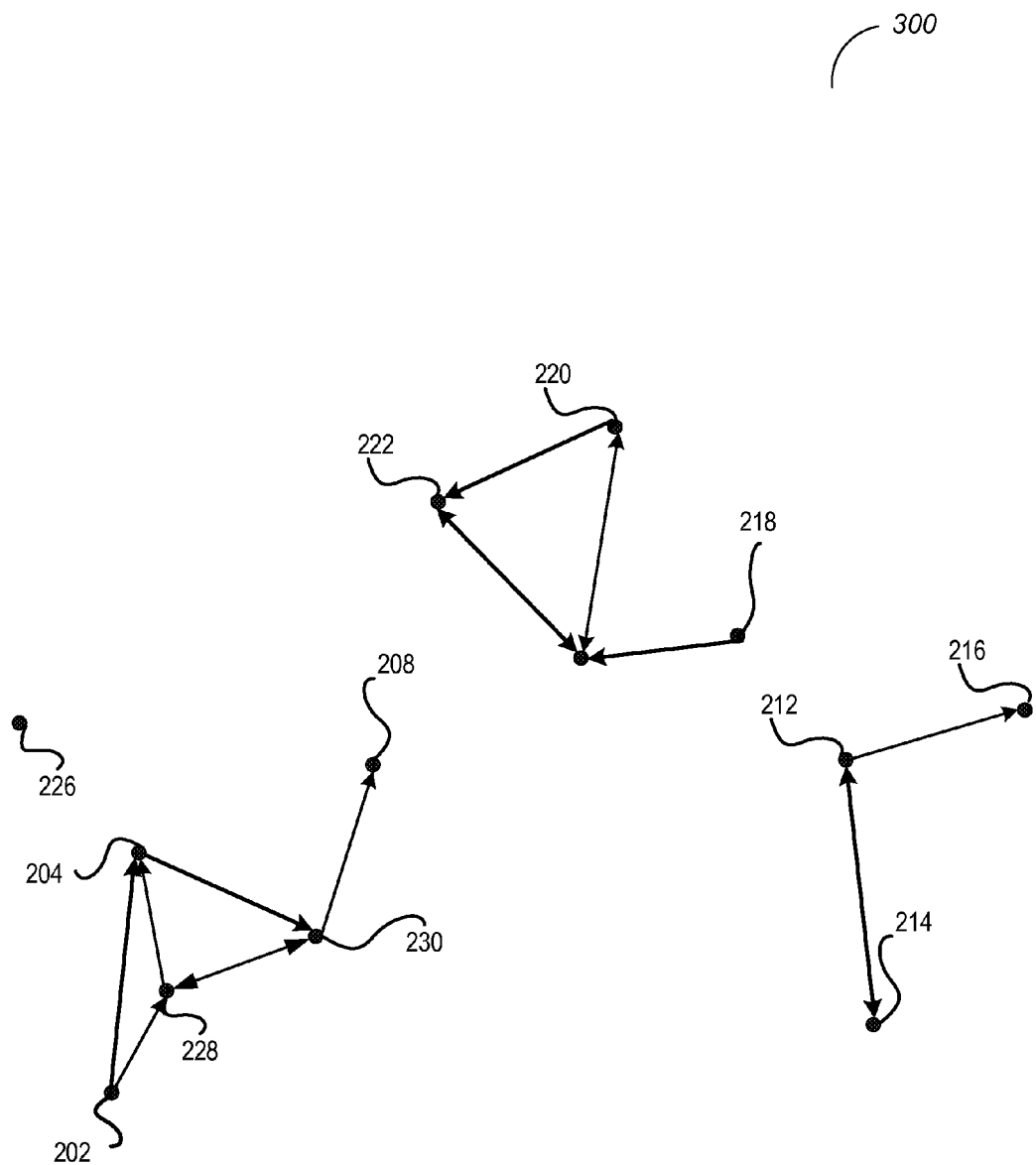
FIG. 3 is an example filtered entity graph for a particular resource.

FIG. 3 illustrates an example filtered entity graph 300 for a particular resource. The filtered entity graph 300 can be generated by the additional content system 130 from, for example, the example entity graph 200 of FIG. 2 using a collection of entities associated with the particular resource. The collection of entities is obtained by the additional content system 130 and can include entities occurring in the resource, entities included in metadata associated with the resource, entities appearing in the title or URL of the resource, and other entities extracted from the resource using conventional or other techniques. In some implementations, each node in the filtered entity graph 300 represents an entity in the collection of entities associated with the particular resource. That is, nodes in the entity graph 200 that represent entities not in the collection of entities can be filtered out from the entity graph 200. Thus, nodes 206, 210, and 224 of FIG. 2 have been removed. Nodes 202, 204, 208, 212, 214, 216, 218, 220, 222, 226, 228, and 230 remain because they correspond to the entities that are associated with the first resource. Edges that connect to filtered nodes can also be removed while edges that do not connect to a filtered nodes and properties of those edges, e.g., direction and weight, can be preserved when generating the filtered entity graph 300.

Figure 4:
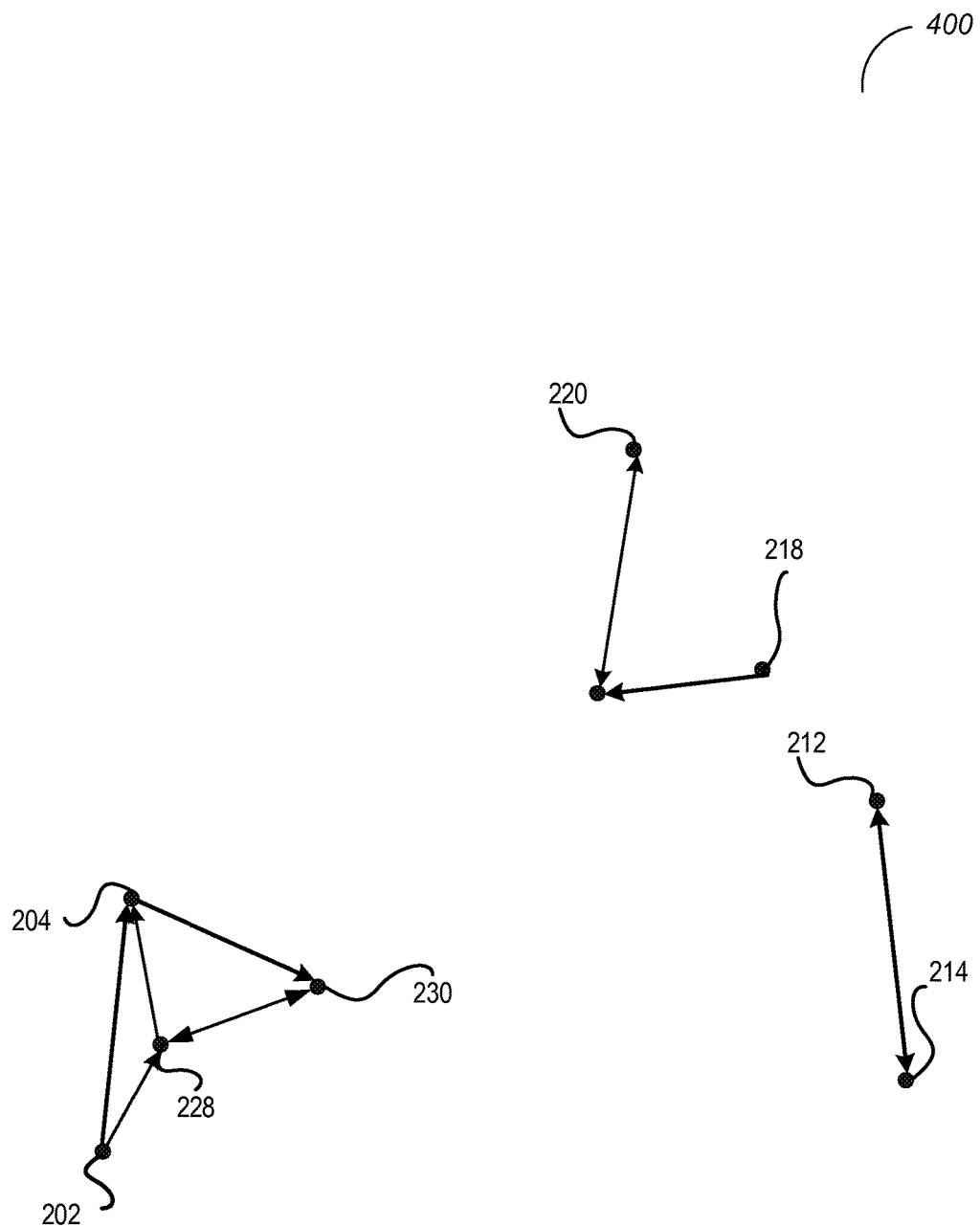
FIG. 4 is an example entity graph generated from a filtered entity graph for a particular resource.

FIG. 4 illustrates an example entity graph 400 generated from the filtered entity graph 300 for the particular resource. In this example, the additional content system 130 removes nodes that do not have any edges, e.g., node 226, from the filtered entity graph 300. Additionally, the additional content system 130 removes all of the nodes that do not have any outgoing edges, e.g., nodes 208, 216, and 222 from the filtered entity graph 300. The additional content system 130 identifies the entities represented by the remaining nodes 202, 204 212, 214, 218, 220, 228, and 230, e.g., the nodes that have not been filtered out, as central entities of the resource.

In some implementations, the filtered entity graph 300 can be filtered in other ways before central entities are identified. For example, if a node represents an entity that is a substring of another entity represented by another node in the graph, the node can be removed from the graph. In another example, after nodes that do not have any outgoing edges are removed, the graph can be filtered again to remove nodes that do not have any edges, e.g., nodes whose only edges connected to nodes that were filtered out because they did not have any outgoing edges. Additionally, in some implementations, some nodes that have outgoing edges may be filtered out. For example, nodes whose edges all have scores below a specified threshold value can be removed from the graph, e.g., because they are not strongly related to any other remaining nodes.

While all of the remaining nodes in the entity graph 400 are connected to at least one other node, the graph may consist of two or more connected components that are not connected to each other, e.g., the component made up of nodes 202, 204, 228, and 230; the component made up of nodes 212 and 214; and the component made up of nodes 218 and 220. In some implementations, a component may be removed unless it includes at least one node that represents an entity that appears in at least one of the title of the resource, the URL of the resource, or in metadata (e.g., hash tags or keywords) associated with the resource. Alternatively or in addition, a component may be removed unless it includes at least one node that represents an entity that appears in a log of search queries that have resulted in requests for the resource.

In some implementations, before the central entities are identified, the additional content system 130 obtains search results for each entity represented by a node in the filtered entity graph 300, e.g., from search engine 120 of FIG. 1. The additional content system 130 can use the obtained search results to further the filtered entity graph 300. For example, if search results for two of the remaining entities overlap, e.g., search results for one entity are a subset of search results for the other entity, the node that represents the entity with the less diverse search results, e.g., the entity having search results that are a subset of search results for another entity, can be removed.

Once the central entities are identified, the additional content system 130 generates an initial centrality score for each central entity based on weights of the outgoing edges of the node representing the entity. For instance, the initial centrality score for an entity A represented by node A in the entity graph can be based on the ratio of the sum of the weights of the outgoing edges of node A to the sum of the weights of all of the edges in the entity graph. Thus, nodes that have a large number of heavily-weighted outgoing edges will have higher initial centrality scores.

In some implementations, the initial centrality score for an entity A represented by node A can also depend on the outgoing edges of nodes that neighbor node A. In these implementations, the initial centrality score can be determined by identifying a set of entities that includes node A and one or more nodes to which node A has an outgoing edge. The initial centrality score for entity A can then be based on the weights of the edges between the nodes in the set. For example, the initial centrality score can be proportional to the sum of the weights of every edge between any two nodes in the set. The sum can be normalized using the sum of the weights of each edge in the filtered entity graph.

In some implementations, the additional content system 130 adjusts the initial centrality scores using one or more signals to generate a final centrality score for each central entity.

One example signal that can be used by the additional content system 130 to adjust the initial centrality score is how often the entity occurs in the resource. That is, the final centrality score for an entity can be greater the more times the entity occurs in the resource. A second signal potentially used by the additional content system 130 is how often the entity occurs in the collection of resources. The initial centrality score for an entity can be decreased based on how often the entity occurs in the collection of resources so that scores for entities that occur frequently in the collection are lower than those of entities that do not occur frequently. In some implementations, the initial centrality score for each entity is adjusted using the inverse document frequency (IDF) for the entity. The IDF for the entity can be the number of times the entity occurs in the resource divided by the number of times the entity occurs in the collection of resources. By adjusting the initial centrality score for an entity using the IDF, the additional content system 130 ensures that entities are not deemed to be highly relevant to a main topic of the resource simply because they occur frequently in other resources in the collection.

Another signal that can be used by additional content system 130 is whether the entity appears in a log of search queries that have resulted in requests for the resource. In particular, entities that appear in the log of search queries can have their initial centrality scores increased. In some implementations, entities appearing more frequently in the log of search queries will have their scores increased by a larger amount than scores for those that appear less frequently.

Additional signals can relate to where the entity occurs in the resource. For example, entities that occur in the title of a resource, the URL of the resource, or in metadata associated with the resource can have their initial centrality scores increased.

Figure 5:
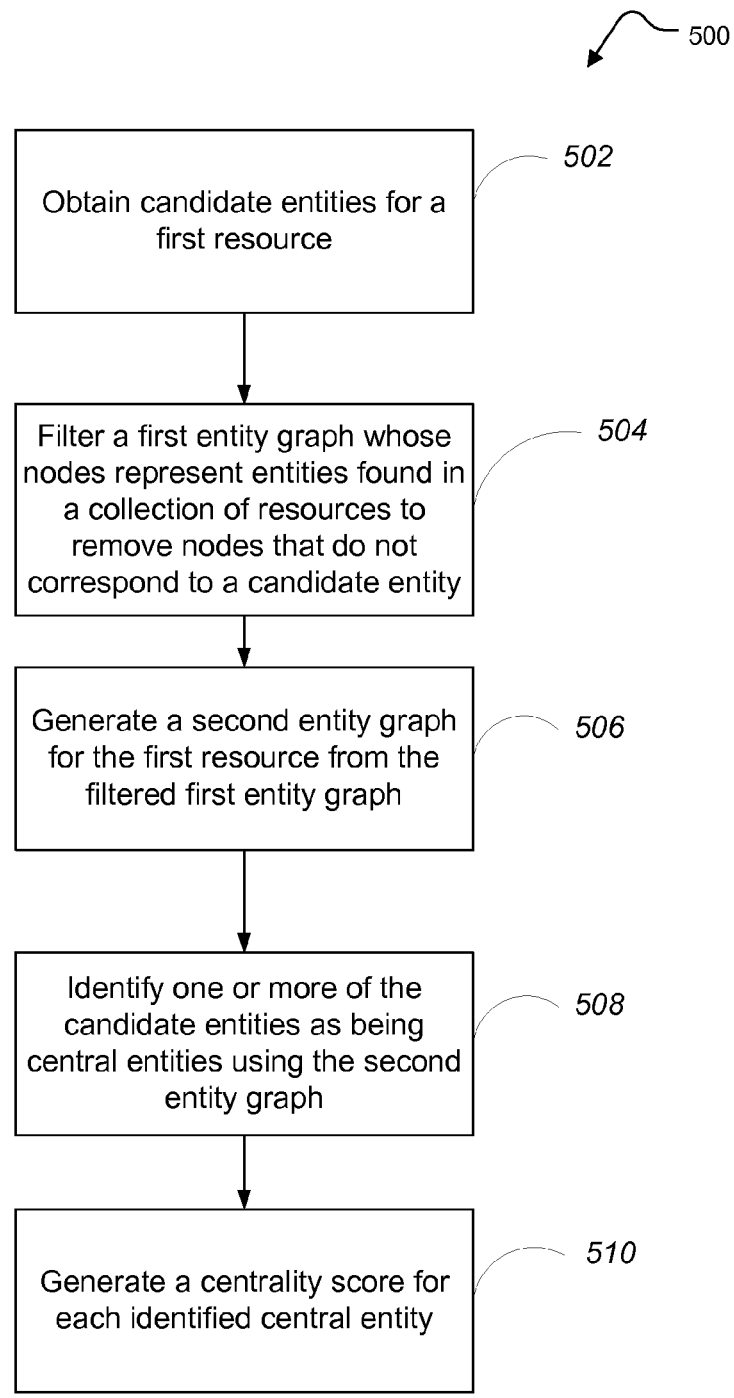
FIG. 5 is a flow diagram illustrating an example technique for identifying and scoring central entities for a resource.

FIG. 5 is a flow diagram illustrating an example technique 500 for identifying and scoring central entities for a resource. The technique 500 can be performed by one or more data processing apparatus. For example, an additional content system (e.g., the additional content system 130 of FIG. 1) can be used to perform the technique 500.

The system obtains candidate entities for a first resource (502). The candidate entities for the first resource can be, for example, entities extracted from the resource by conventional or other techniques.

The system filters a first entity graph whose nodes represent entities found in a collection of resources to remove nodes that do not correspond to a candidate entity (504). Nodes in the first entity graph are connected to other nodes by edges. Edges can have a weight and/or a direction.

The system generates a second entity graph for the first resource from the filtered first entity graph (506). To generate the second entity graph, the system removes nodes from the filtered first entity graph that do not have any outgoing edges. In some implementations, other nodes are also removed from the filtered first entity graph.

The system identifies one or more of the candidate entities as being central entities using the second entity graph (508). The central entities can be, for example, the entities represented by the nodes in the second entity graph.

The system generates a centrality score for each identified central entity (510). The scores for a particular central entity can be based at least in part on the weights of the outgoing edges of the node representing the particular central entity.

Referring to FIG. 1, in some implementations, the additional content system 130 can determine whether one of the entities associated with a resource is the topical entity for the resource, i.e., whether any of the entities represent the predominant topic of the resource. A topic can be a predominant topic of a resource if, for example, the topic describes more than a threshold proportion of the content included in the resource. The entities associated with the resource can be, for example, the identified central entities described above. Alternatively, the associated entities can be any entities obtained by the additional content system 130, e.g., entities extracted from the resource.

Figure 6:
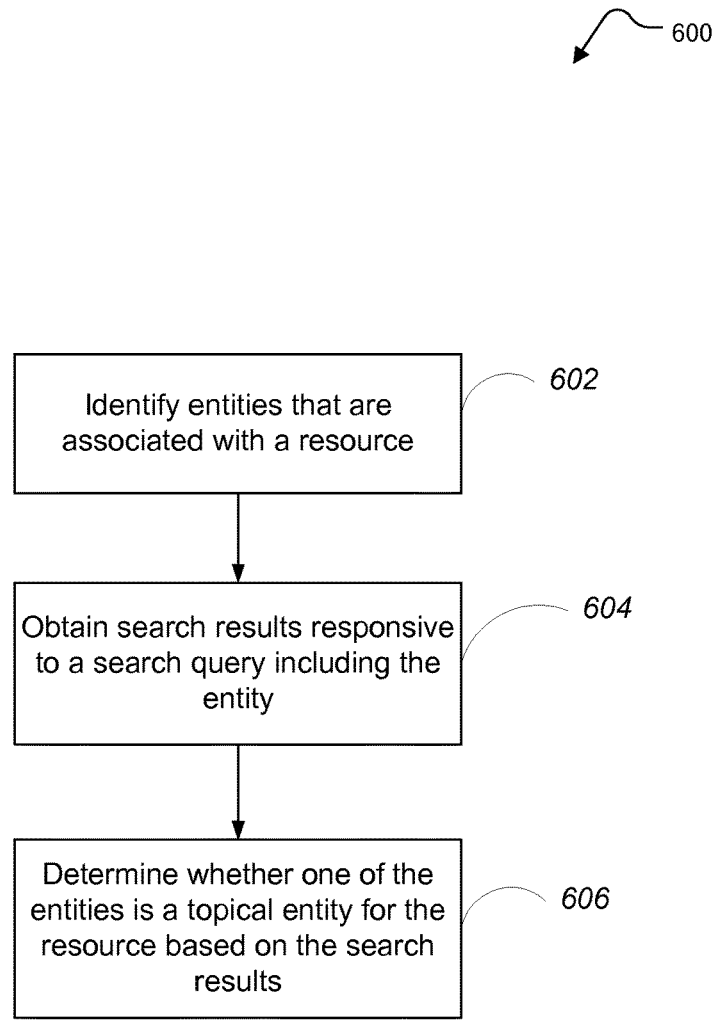
FIG. 6 is a flow diagram illustrating an example technique for determining whether any of the entities associated with a resource are the topical entity of the resource.

FIG. 6 is a flow diagram illustrating an example technique 600 for determining whether any of the entities associated with a resource are the topical entity of a resource. The technique 600 can be performed by one or more data processing apparatus. For example, an additional content system (e.g., the additional content system 130 of FIG. 1) can be used to perform the technique 600.

The system identifies one or more entities that are associated with a resource (602). The resource can be, for example, a resource currently being presented to a user on a client device.

For each identified entity, the system obtains search results responsive to a search query derived from one or more of the entities (604). In some implementations, the search query for a particular entity includes only the entity. Alternatively, if the entity includes more than one word, the query can include, for example, Boolean operators, e.g., AND or OR, between the terms of the query. The query can also include other terms, e.g., other entities associated with the resource. For example, if the system has determined that none of the identified entities are the topical entity of the resource, the system may generate combined queries that include two or more entities associated with the resource.

The system obtains the search results from a search engine (e.g., the search engine 120 of FIG. 1). In some implementations, the system also obtains scores for each search result above a specified number in a ranking of the search results. The scores are assigned to the search results by the search engine using a scoring function and are used to rank the search results.

The system determines whether one of the entities is a topical entity for the resource based on the search results (606). The system can determine whether a search result referencing the resource appears in search results returned for each entity. In particular, the system can determine whether a search result referencing the resource appears above a specified number, e.g., in the top ten, one hundred, or one thousand, in a ranking of the search results. If the resource only appears above the specified number in an order of search results responsive to one of the queries, the system can determine that the entity corresponding to that query is the topical entity of the resource.

If a search result referencing the resource appears above the specified number in the order of search results responsive to multiple queries, the system can consult the obtained scores for the search results referencing the resource to determine the topical entity for the resource. That is, the system compares the obtained scores for the search result referencing the resource responsive to each query for which the search result appears above the specified number. For example, if a search result referencing the resource appears in the top ten search results responsive to a query including entity A and responsive to a query including entity B, but the search result referencing the resource has a higher score responsive to the query including entity A, the system would determine that entity A is the topical entity for the resource. Alternatively, the system can select the entity having the highest centrality score as the topical entity.

If a search result referencing the resource does not appear in search results or, alternatively, above the specified number in the search results, responsive to any of the queries, the system can determine that none of the associated entities are a topical entity for the resource.

In some implementations, however, the system can determine that an associated entity is the topical entity for a particular resource even if a search result referencing the resource does not appear above a particular threshold in search results responsive to any of the queries. For example, for an obscure web page for a consumer product, the system can still return an entity representing the product as the topical entity of the web page even though the web page does not appear above a particular threshold in search results for that topical entity.

In some circumstances, certain queries can trigger the search engine to include a type of content in the search results. The type of content can be, for example, shopping results, map results, or an answer box. An answer box is a user interface element including a formatted presentation of content that is responsive to the query. For example, if a query refers to weather in a particular location, a weather answer box can include a forecast of weather in the particular location. If the search results obtained from the search engine for a query including a particular entity contain one of these specific types of content, the requirement that the resource must appear above a specified threshold in the search results for the entity to be the topical entity can be relaxed.

For example, if the search results responsive to the query including the particular entity include one of the types of content and the entity occurs in the title or the URL of the resource, the system can determine that the entity is the topical entity of the resource. For instance, if an obscure web page titled "Buy the Baby Gym here" has an associated entity "baby gym" and obtained search results responsive to the query "baby gym" include shopping search results that link to online retailers where a product called "baby gym" can be purchased, the system can determine that "baby gym" is the topical entity of the resource even if the resource does not appear above a particular threshold in the search results for the query "baby gym."

In some implementations, prior to performing the technique 600, the system consults a log of previously submitted queries that resulted in a request for the resource to determine whether any of the entities is the topical entity for the resource. For example, the system can determine if any of the entities are included in a previously submitted query that resulted in a proportion of the requests for the resource that exceeds a specified threshold proportion. If the proportion exceeds the threshold value for only one of the entities, the system determines that the entity is the topical entity. If the proportion exceeds the threshold value for multiple entities, the system can determine that the entity responsible for the highest proportion of the requests is the topical entity. If there is insufficient information in the query log for the resource or the proportion does not exceed the threshold value for any of the entities, the system can perform the technique 600 in order to determine whether any of the entities are the topical entity for the resource. The query log may be determined to have insufficient information about the resource if, for example, it contains less than a threshold number of previously submitted queries that resulted in requests for the resource. Alternatively, the system can consult the query log if the technique 600 does not result in a topical entity being identified.

Figure 7:
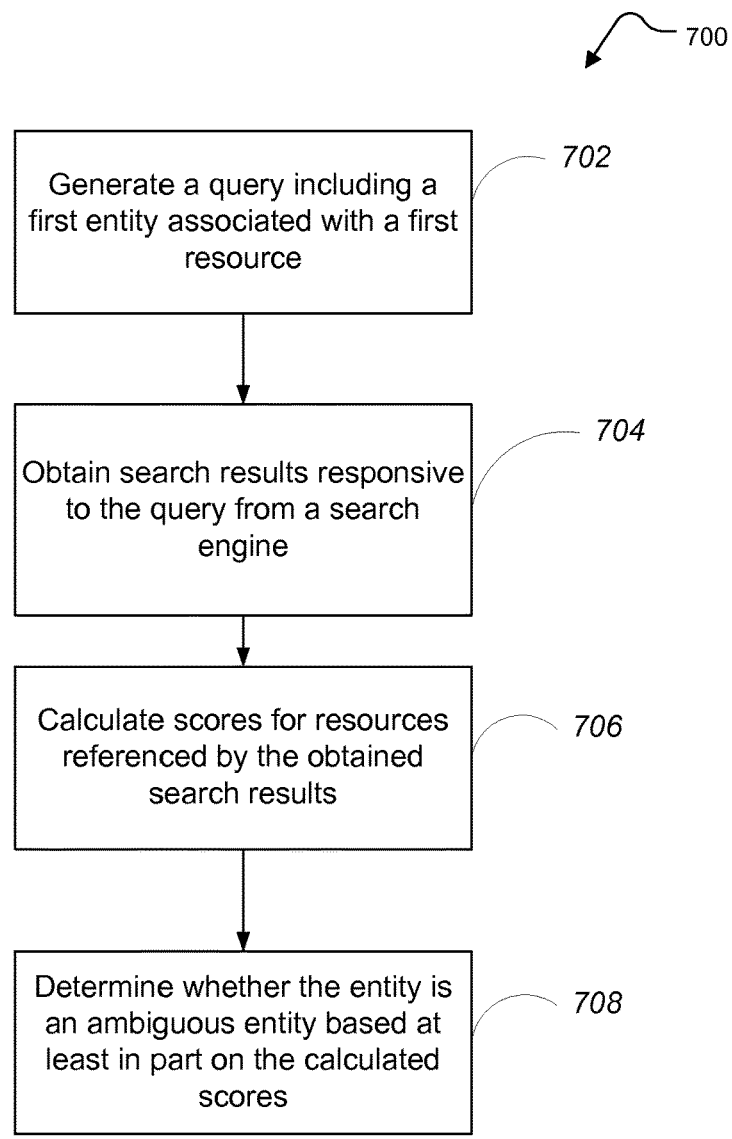
FIG. 7 is a flow diagram illustrating an example technique for determining whether an entity associated with a resource is ambiguous.

FIG. 7 is a flow diagram illustrating an example technique 700 for determining whether an entity associated with a resource is ambiguous. The technique 700 can be performed by one or more data processing apparatus. For example, an additional content system (e.g., the additional content system 130 of FIG. 1) can be used to perform the technique 700.

In some implementations, it may be desirable to determine whether any of the entities that are associated with a particular resource are ambiguous. An ambiguous entity is an entity that, while related to one or more main topics of the particular resource, primarily represents topics or concepts that are not relevant to the one or more main topics of the particular resource in the resources indexed by search engine 120 of FIG. 1. That is, the entity is primarily used in a different context from that of the particular resource. If this is the case, search results responsive to a query including the entity will likely not be related to any of the one or more topics of the resource, but will instead mostly be related to the other contexts that the entity is used in. Thus, a user viewing the particular resource may not be interested in seeing additional content generated based on search results responsive to a query including an ambiguous entity, e.g., because the additional content will not be relevant to the current resource.

For example, for a resource, e.g. an online encyclopedia page about Moscow, a city in Idaho, an entity associated with the resource may be "Moscow." The entity "Moscow" may be identified by the system as a central entity, since it represents the main topic of the resource. However, in the vast majority of the resources indexed by the search engine, the entity "Moscow" may represent Moscow, a city in Russia. Thus, almost all of the search results responsive to the query "Moscow" may not be relevant to the online encyclopedia page about Moscow, Id., and a user viewing the online encyclopedia page may not desire to see additional content that is generated based on those search results.

In the example technique 700 for determining whether a first entity associated with a first resource is ambiguous, the system generates a query including a first entity associated with a first resource (702). The entity associated with the resource can be, for example, one of the identified central entities described above. Alternatively, the associated entity can be any entity obtained by the additional content system 130, e.g., extracted from the resource. The resource can be, for example, a resource currently being presented to a user in a user interface on a client device.

The system obtains search results responsive to the query from a search engine (704) and calculates scores for resources referenced by the obtained search results (706). In some implementations, the system calculates a score for each resource referenced by a search result that is above a specified number in a ranking of the search results, as determined by the search engine. Generally, the score for a particular resource is a measure of relatedness between entities associated with the particular resource and entities other than the first entity associated with the first resource.

In some implementations, the score is equal to the number of entities other than the first entity that are associated with both the first resource and the particular resource. The entities associated with the resources are obtained by the system after being determined from the resources using conventional or other techniques. In some implementations, the system does not compare each of the entities associated with the resources, but instead only compares a specified number, e.g., ten, twenty or a hundred, of associated entities for each resource. When more than the specified number of entities are associated with one of the resources, the entities used in the comparison may be the central entities for the resource obtained as described above, or, alternatively, may be the entities that occur most frequently in the resource (e.g., are present the highest number of times in the content of the resource).

The score for a particular resource can also be calculated using an entity graph, e.g., the entity graph stored in entity graph store 140, as described in more detail below in conjunction with FIG. 8. In some implementations, the final score for a particular resource is a combination, e.g., the sum or the product, of the score calculated based on the number of entities that are associated with both resources and the score calculated using the entity graph. Alternatively, the score calculated based on the entity graph can only be considered when there are no entities that are associated with both resources.

The system determines whether the entity is an ambiguous entity based at least in part on the calculated scores (708). For example, the system can determine the proportion of resources that have scores exceeding a first specified threshold value. Then, the system determines that the entity is ambiguous if the proportion is below a second specified threshold value. The second specified threshold value can be, for example, one half, so that an entity is ambiguous if less than half of a specified number of the resources referenced by search results responsive to a query including the entity are sufficiently related to the first resource. Alternatively, the system can determine a total score for the entity based on the calculated scores (e.g., using an additive or multiplicative metric), and determine that the entity is ambiguous if the total score is below a threshold value.

In some implementations, once an entity is determined to be ambiguous, the system can discard the ambiguous entity, e.g. remove the entity from a list of central entities or from a list of entities otherwise associated with the resource. Alternatively, the system can disambiguate the entity, e.g., create a new entity that represents a main topic of the resource and is not primarily used to represent different topics in other resources. The system can generate the new entity by appending one or more terms to the ambiguous entity. In some implementations, the system appends another entity that is associated with the resource. Alternatively, the other entity can be one of the central entities, e.g., the entity having the highest centrality score as determined by the system using the technique described in FIG. 4. Once a new entity is generated using a previously-ambiguous entity, the system can, in some implementations, verify that the new entity is not ambiguous using the technique 700. In the above example, once the system determines that the entity "Moscow" is ambiguous with respect to a resource about the city Moscow, Id., the system can disambiguate the entity by appending another entity associated with the resource to the "Moscow" entity to create a new entity. If one of the other entities associated with the resource is "Idaho," one possible new entity is "Moscow Id."

In some implementations, the system can, instead of or in addition to creating a new entity using entities associated with the resource, obtain candidate disambiguated entities from a suggestion service that offers one or more suggested query completions for search queries. The suggestion service can be provided, for example, by the search engine 120 of FIG. 1. The system submits the entity as a query to the suggestion service and obtains one or more query suggestions, i.e., candidate entities, that contain the entity, e.g., that contain the entity and one or more terms appended to the entity. For each of the candidate entities, the system can determine whether or not the new entity is ambiguous using the technique 700. If the candidate entity is not ambiguous, the system can associate the entity with the resource. For example, for the ambiguous entity "Moscow," the suggestion service may return multiple candidate entities, including "Moscow Russia," "Moscow airport," and "Moscow news," all of which would also likely be determined to be ambiguous. However, the suggestion service may also return the non-ambiguous entity "Moscow Id." as a candidate entity.

The system can also consult a log of search queries leading to the resource to generate disambiguated entities. For example, the system can select, of the queries occurring in the query log more than a specified number of times, queries that contain the ambiguous entity. The system can then vet the selected queries, e.g., determine whether the queries are ambiguous or not, and associate one or more of the queries with the resource.

Figure 8:
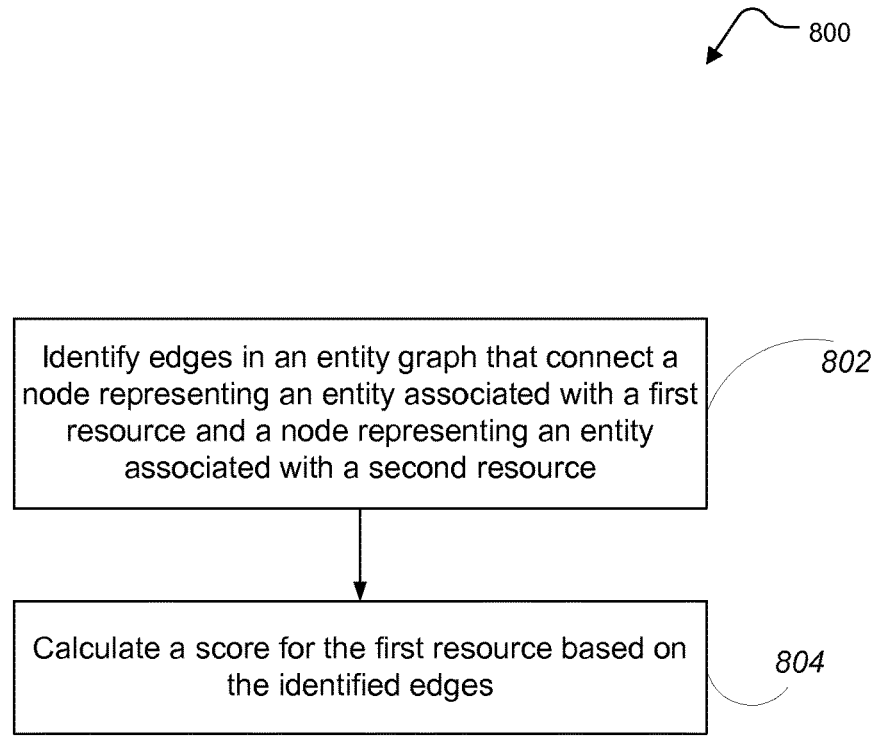
FIG. 8 is a flow diagram illustrating an example technique for calculating a score measuring the relatedness of entities associated with a first resource to entities associated with a second resource using an entity graph.

FIG. 8 is a flow diagram illustrating an example technique 800 for calculating a score measuring the relatedness of entities associated with a first resource to entities associated with a second resource using an entity graph. The technique 800 can be performed by one or more data processing apparatus. For example, an additional content system (e.g., the additional content system 130 of FIG. 1) can be used to perform the technique 800.

The system identifies edges in an entity graph that connect a node representing an entity associated with the first resource and a node representing an entity associated with the second resource (802). As described above, nodes in the entity graph represent entities associated with resources in a collection of resources and are linked by edges. An edge can have a weight and a direction. In some implementations, only edges connecting nodes representing a specified number of entities associated with the resources are included in the filtered entity graph.

The system calculates a score for the first resource based on the identified edges (804). In some implementations, the score is equal to the number of identified edges. Alternatively, the score can be based in part on the weight of each identified edge. For instance, the score can be the number of identified edges having a weight that exceeds a particular threshold. Alternatively, the score can be based on a sum of the weights of the identified edges. In some implementations, the system can apply a normalization factor to the score.

Once the additional content system 130 selects the entities that are central to a resource, it can use the central entities to generate additional content that is relevant to the resource. In particular, the additional content system 130 interacts with the additional content module 110 to present additional content relevant to a resource being presented to a user by a web browser. The presented additional content is content that the additional content system 130 has deemed relevant to the currently presented resource and that is most complimentary to the viewing experience of the user of the web browser. The presented additional content can include images and videos related to the currently presented resource, links to and descriptions of web pages relevant to the currently presented resource, and so on.

Figure 9:
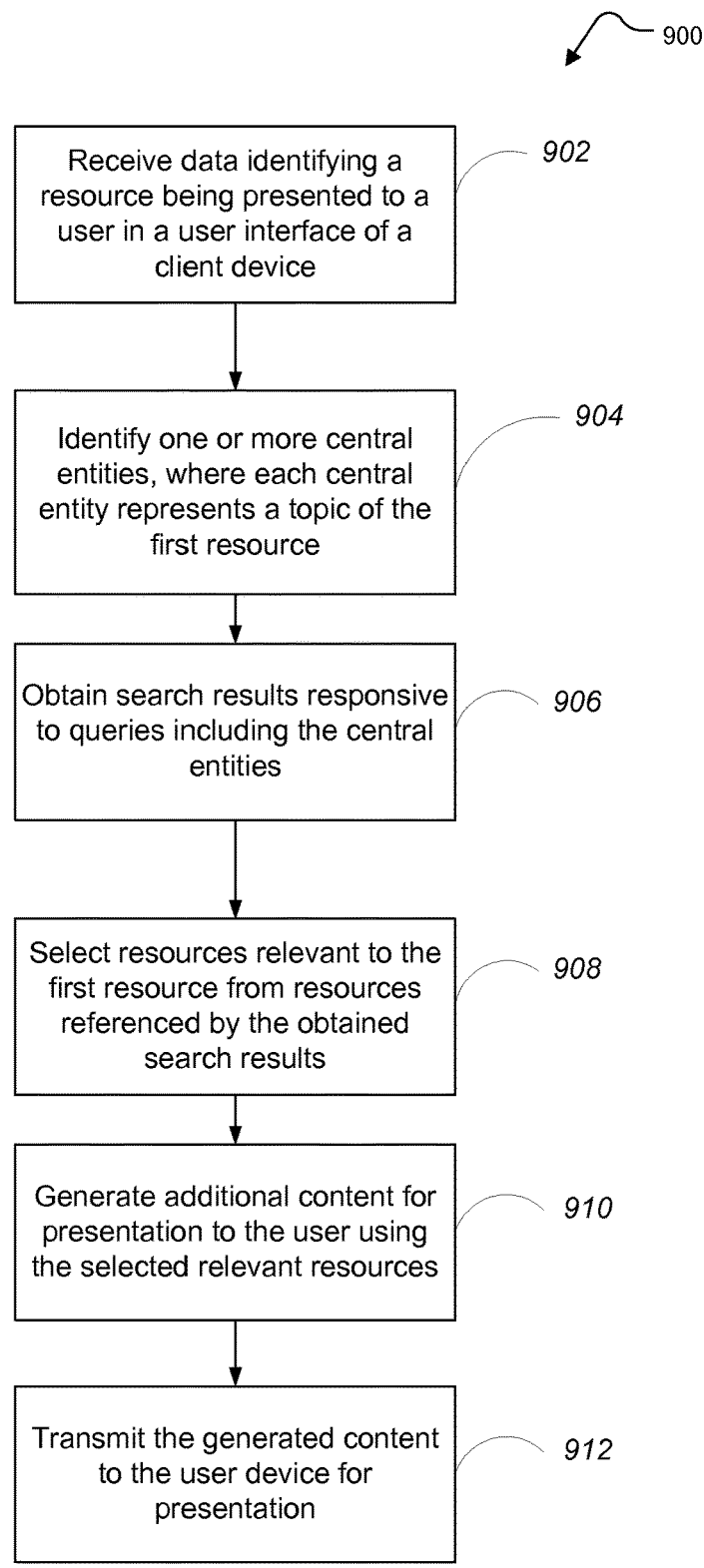
FIG. 9 is a flow diagram illustrating an example technique for generating additional content relevant to a resource currently being presented to a user in a user interface.

FIG. 9 is a flow diagram illustrating an example technique 900 for generating additional content relevant to a resource currently being presented to a user in a user interface. The technique 900 can be performed by one or more data processing apparatus. For example, an additional content system (e.g., the additional content system 130 of FIG. 1) can be used to perform the technique 900.

The system receives data identifying a first resource being presented to a user in a user interface of a client device (902). The data identifying the first resource can be a resource locator, e.g., a URL, of the resource. Once the system receives the data, the system uses the data to obtain the entities that are associated with, e.g., extracted from, the resource. Alternatively, the system can receive the associated entities directly, e.g., without having to obtain them using the resource URL.

The system identifies one or more central entities, where each central entity represents a topic of the first resource (904). As described above, e.g., with reference to FIG. 5, the system can use obtained associated entities to identify the central entities of the first resource using an entity graph. In some implementations, the system also determines a final centrality score for each of the central entities. The final centrality scores can be determined, for example, as described above with reference to FIG. 4.

The system obtains search results responsive to queries including the central entities (906). The search results are obtained from a search engine, e.g., search engine 120 of FIG. 1. Each obtained search result for a particular query is associated with a score that generally relates to both the quality and the relevance to the query of the resource corresponding to each search result. When a search result references an image, the search result can include a thumbnail of the image instead of or in addition to the snippet of information. Similarly, search results referencing video content can include a screenshot, or a thumbnail of a screenshot, from the video. Alternatively, the search results can include an embedded video player for playing the video content. In some implementations, the system can determine whether any of the identified central entities are ambiguous, e.g., as described above with reference to FIG. 7. For any entity that is determined to be ambiguous, the system can either not obtain search results for a query that includes the ambiguous entity or discard any results obtained responsive to the query. Alternatively, calculated scores for the resources referenced by the obtained search results for the query can be decreased because the entity is ambiguous. Additionally, the system can also disambiguate the entity, e.g., generate one or more new entities that include the ambiguous entity and one or more other terms, and obtain search results for queries including the generated disambiguated entities.

In some implementations, if more than a threshold number of search results are obtained for a particular query, the system can discard search results that are ranked below the threshold number in a ranking of the search results according to respective scores for each result obtained from the search engine.

The system selects resources relevant to the first resource from resources referenced by the obtained search results (908). The system calculates a respective score for each resource referenced by the search results and uses the scores to select the relevant resources. The calculated score for a particular resource is based on the scores obtained from the search engine for the search results referencing the query. For example, the calculated score for a resource can be a sum of the obtained scores of each search result referencing the resource, a product of the obtained scores, the maximum of the obtained scores, and so on.

Once calculated, the scores can be adjusted based on one or more factors. For example, because the topical entity represents the predominant topic of the resource, the system can increase the scores of resources referenced by search results responsive to a query including the topical entity. Additionally, the scores for particular types of resources can be increased. For example, scores of videos and images can be increased, because these types of content are more complimentary, e.g., because they can be viewed without navigating away from the current resource or having to open a new browser window, to the resource a user is currently viewing.

In some implementations, the system selects each resource whose score exceeds a specified threshold as a relevant resource. Alternatively, the system identifies a specified number of resources as being relevant. In yet other implementations, the system can select specified numbers of highest scoring resources of each of multiple types, e.g., news articles, videos, images, and so on, of resources as being relevant resources. For example, the system can select a first number of highest scoring news articles, a second number of highest scoring images, and so on. Alternatively, resources can be considered for selection only if their scores exceed the threshold value. That is, if fewer than the second number of videos have scores exceeding the requisite threshold value, only the videos whose scores exceed the threshold will be selected.

In some implementations, the system can use the final centrality scores for the central entities to determine which resources to select as relevant resources. For example, in some implementations, the obtained score for a resource referenced in search results responsive to a query including a particular entity can be adjusted based on the final centrality score for the central entity, e.g., so that scores for resources obtained using higher-scoring central entities will be higher than scores for resources obtained using lower-scoring central entities.

Additionally, if a central entity has a final centrality score that exceeds a particular threshold value and search results obtained for a query including the central entity include at least one additional type of search results, e.g., video results, image results, or news results, that central entity can be immunized. Scores for resources referenced in search results for immunized central entities can be adjusted so that their scores are not exceeded by resources referenced in search results for other entities that do not include any additional types of search results, even if those other entities have higher centrality scores. Because resources of particular types may be considered to be more interesting or complimentary by users, immunizing central entities that have sufficiently high final centrality scores ensures that, once an entity used to obtain the resources is sufficiently relevant to the resource being presented to the user, the selected relevant resources will include diverse types of resources that are interesting and complimentary.

In some implementations, if none of the entities have a centrality score that exceeds a threshold value, the system may determine not to select relevant resources and not to display additional content for the first resource, e.g., because content generated using central entities with low final centrality scores would not be sufficiently interesting or related to the resource being presented to the user.

The system generates additional content for presentation to the user using the selected relevant resources (910). The additional content can include information from the search results that reference each selected resource. The additional content can optionally also include additional content included in the resource, e.g., thumbnails of images included in news articles or other web pages. For example, for each selected resource, the additional content can include a snippet of information about the resource (e.g., the title of the resource, and descriptive text about the resource) and a link to the resource. For an image, the additional content can include a thumbnail of the image and a link that, when activated, results in a higher-quality version of the image being displayed. For videos, the additional content can include a screenshot from the video or, alternatively, the additional content includes an embedded video player that, when activated, plays the video. For news articles, the additional content can include an image included in the news article, the date of publication of the article, and the publisher of the article.

In some implementations, the system can identify whether the first resource is directed to a consumer product, place, or other specified type of entity and adjust the content that is to be presented to the user accordingly. The system can determine that the resource is directed to a specified type of entity based on the search results obtained for the topical entity of the resource. If the system has determined that the resource has no topical entity, the content that is to be presented to the user is not adjusted, e.g., the presented content consists of the highest scoring pieces of content presented as described above.

If the search results responsive to the query including the topical entity of the resource indicate that the resource is directed to a consumer product, e.g., because they include shopping results that the search engine only includes responsive to queries referring to consumer products, the system can adjust the content that is to be presented to the user to include at least a portion of the returned shopping results. The shopping results can include price comparisons of the product sold at various online retailers, reviews of the product, other products that are similar to the product, accessories for the product, and so on.

If the search results responsive to the query including the topical entity of the resource include map results, the system can determine that the system is directed to a place of interest and include at least a portion of the map results in the additional content presented to the user. The presented map results can include a map of the place and the surrounding area, reviews of the place, related places, hours of operation of the place, and so on.

Alternatively, the system can determine whether the resource is directed to a specified type of entity by accessing data that identifies pre-generated associations between particular resources and the specified entity type to which they are directed. In some implementations, the additional content can be adjusted for the user based on the user's browsing history. If sufficient information about the user's browsing history is available, the scores of entities related to the user's browsing history can be increased. For example, the score of any entities included in a log of search queries previously submitted by the user can be increased. Entities present in previously submitted queries that are most recent, e.g., that immediately precede the user accessing the current resource, can have their scores increased by a greater amount.

Alternatively or in addition, if information about resources previously presented to the user is available, scores of entities that are associated with resources previously presented to the user can be increased. In particular, scores of entities that are central entities of resources recently presented to the user can be increased.

The system transmits the generated content to the client device for presentation (910). The system can transmit the content to an additional content software module executing on the client device. The additional content software module then, in turn, presents the generated content to the user while the first resource is also being presented, e.g., so that the user can view the additional content while viewing the first resource. In some implementations, the additional content software module presents each type of received content separately, e.g., in its own portion of the user interface. The format of presentation of the additional content by the additional content software module will be described in more detail below with reference to FIG. 10, FIG. 11, and FIG. 12.

Figure 10:
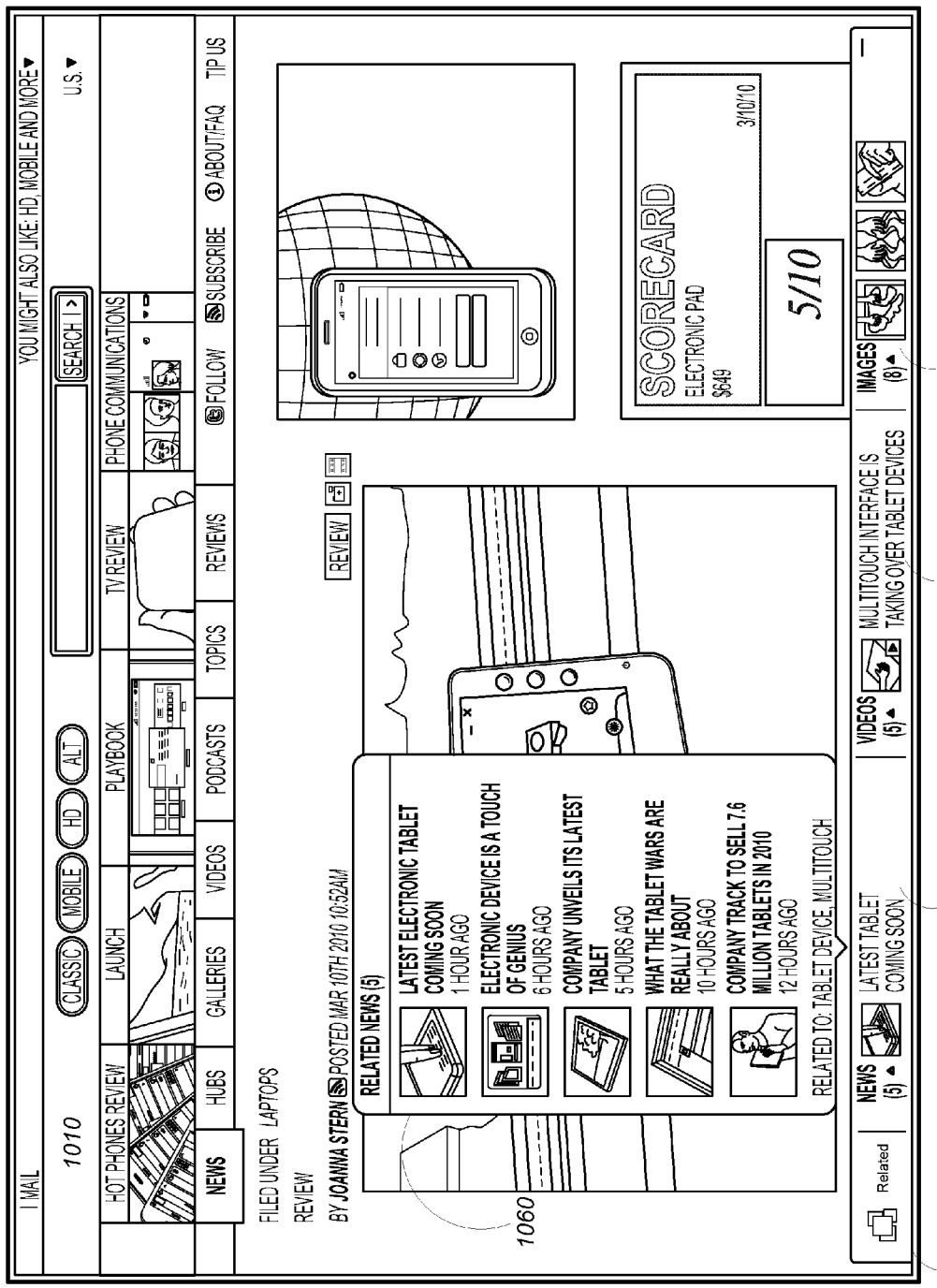
FIG. 10 illustrates an example user interface where content relevant to a resource is being presented.

FIG. 10 illustrates an example user interface 1000 where content relevant to a first resource is being presented. The example user interface 1000 includes a first resource 1010 that is being presented to a user, e.g., by a web browser executing on a client device. In this example, the first resource 1010 is directed to a product review for a tablet computing device. The user interface 1000 also includes a user interface element 1020 where additional content relevant to the first resource is presented to the user. The additional content can be received and presented by an additional content software module executed by the client device, (e.g., additional content module 110 of FIG. 1). Alternatively, the functionality of the additional content software module can be integrated into the web browser.

While user interface element 1020 is illustrated as being docked to the bottom of the user interface 1000, the user interface element 1020 can be located in other locations on the user interface. For example, the position of the user interface element 1020 can be user configurable. A first portion 1030 of the user interface element is dedicated to presenting news content that is relevant to the topic of the first resource, e.g., relevant to tablet computers, a second portion 1040 is dedicated to presenting relevant video content, and a third portion 1050 is dedicated to presenting relevant images. In the illustrated example, each portion initially displays information about one or more highest-scoring, e.g., most relevant, resources of the respective type. When a user interacts with a portion, e.g., moves their cursor over or selects the portion, the portion expands to display more information about the highest-scoring resources as well as information about other relevant pieces of resources of that type. The other relevant content can be presented in an order that is based on respective scores associated with each resource, e.g., content describing the highest-scoring resource can be displayed at the top of the expanded portion followed by the content describing the second highest-scoring resource, and so on. In the illustrated example, the user has interacted with the first portion 1030 to generate an expanded portion 1060. The expanded portion 1060 contains information, e.g., the title of the resource and a thumbnail of an image included in the resource, about five different resources that include news content. Each piece of content can include a link that, when activated by the user, causes the client device to navigate to the resource described by the piece of content. The expanded portion 1060 also displays the entities that were used to generate the additional news content.

Figure 11:
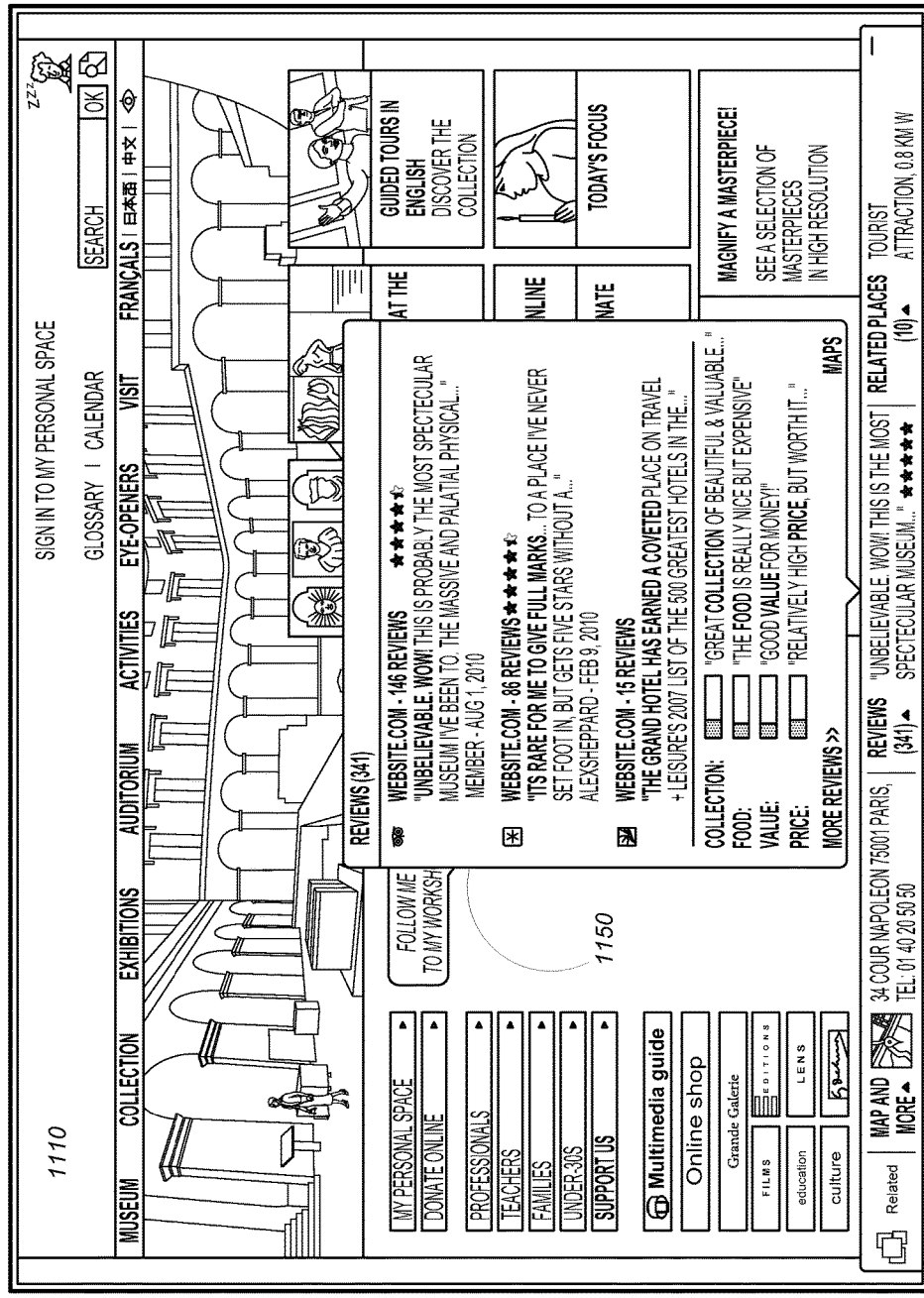
FIG. 11 illustrates an example user interface where content relevant to a resource about a consumer product is being presented.

FIG. 11 illustrates an example user interface 1000 where content relevant to a second resource is being presented. In the illustrated example, the user has navigated to a second resource 1110 which is now being presented to the user in the user interface 1000. The second resource is a web page about an art museum in Paris, France. Because the additional content system that is providing the additional content has determined that the second resource is directed to a place of interest, the types of additional content that are being displayed in user interface element 1020 have been altered. The user interface element 1020 now includes a first portion 1120 that displays additional map content, a second portion 1130 that displays user reviews of the place of interest, and a third portion 1140 that includes content about related places to the place of interest. In the illustrated example, the user has interacted with the second portion 1130 and an expanded portion 1150 has been generated. The expanded portion 1150 displays user reviews of the art museum from the web site website.com. In other circumstances, the expanded portion 1150 can include user reviews from multiple web sites. The expanded portion 1150 also includes an aggregate rating of the museum in multiple categories that is obtained by the additional content system.

Figure 12:
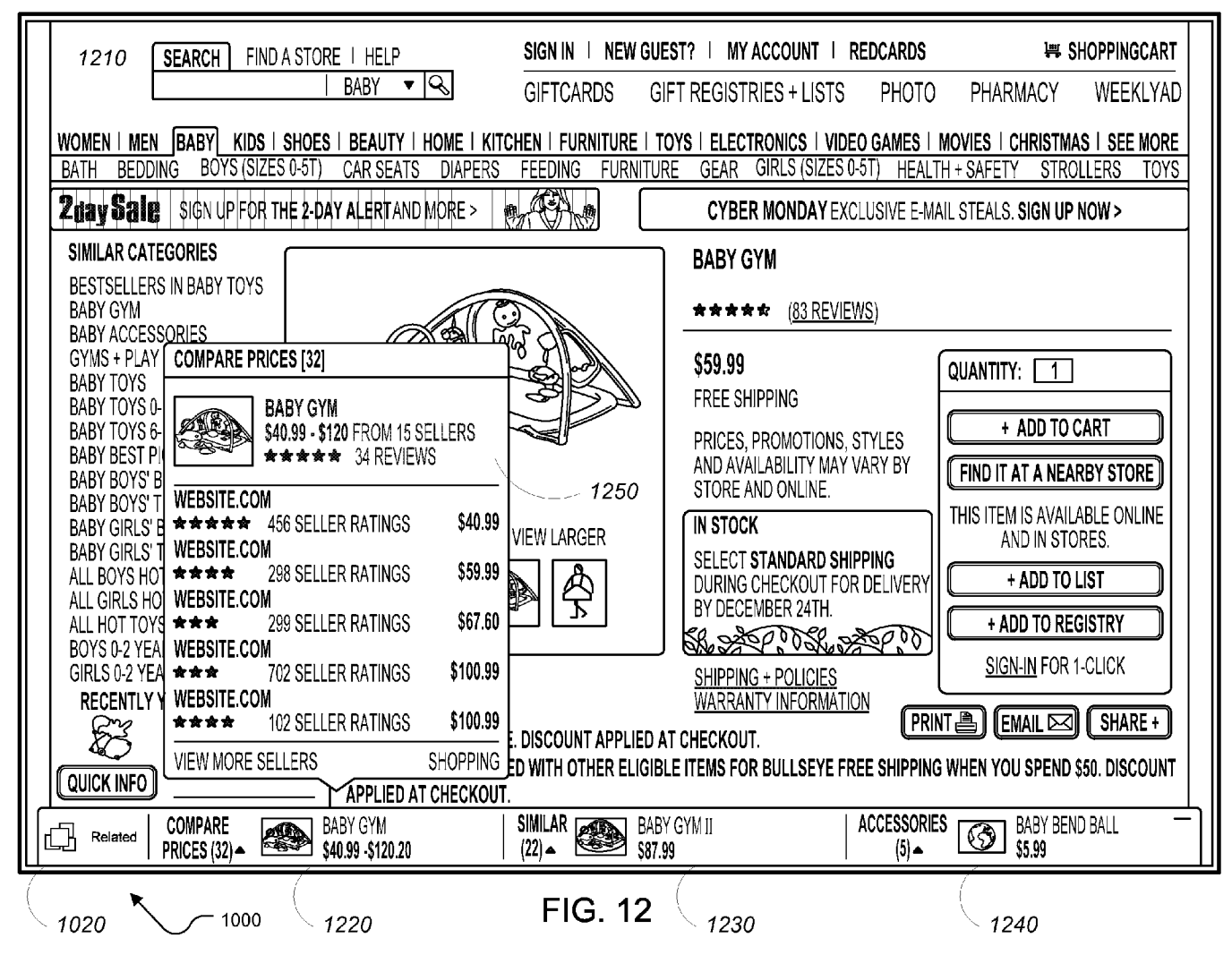

FIG. 12 illustrates an example user interface 1000 where content relevant to a third resource is being presented. In the illustrated example, the user has navigated to a third resource 1210 which is now being presented to the user in the user interface 1000. The third resource is a web page from an online store that is selling a product called "Baby Gym." Because the second resource is an online store selling a consumer product, the user interface element 1020 now includes a first portion 1220 that displays content about other online stores selling the same product, a second portion 1230 that displays content about products that are similar to the "Baby Gym," and a third portion 1240 that displays accessories for the "Baby Gym." In the illustrated example, the user has interacted with the first portion 1220 and an expanded portion 1250 has been generated. The expanded portion 1250 includes content about other online retailers that are selling the "Baby Gym" product that includes the price of the "Baby Gym" at each of the other online retailers and user rating of each of the online retailers. Each piece of content includes a link that, when activated, causes the client device to navigate to the web page selling the "Baby Gym" at the corresponding online retailer.

The order of presentation of respective types of content displayed in each portion of the user interface element 1020 can vary based on, for example, the calculated scores for the additional content for each type or the amount of additional content of each type relevant to the current resource. For example, when a user navigates from one resource to another, additional video content can move from being presented in one portion of the user interface element 1020 to being presented in a second portion, depending on the quality and amount of additional video content relevant to each of the two resources.

Additionally, when there is an insufficient amount of content of a particular type that is relevant to the resource currently being presented to the user, additional content of the particular type can be removed from the user interface element 1020. In some implementations, additional content of the particular type can also be removed if there is an insufficient amount of resources of the particular type that have a score that exceeds a specified threshold, i.e., the content of the particular type is not sufficiently relevant to the currently presented resource.

In some implementations, the user interface element 1020 can include more than three portions, with each portion displaying a respective type of additional content. Additionally, the user interface element 1020 can include one or more portions that display the same type of content regardless of the resource that is currently being presented, e.g., a first portion of the user interface element 1020 can always display news content related to the current resource while the type of content displayed in the other portions of the user interface element 1020 can change depending on the presented resource.

Alternatively, the user interface element 1020 can, in some implementations, include a single portion that displays each type of additional content ordered by the scores of the resources used to generate the content.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
identifying a plurality of entities that are associated with a particular web resource, each entity being a word or a phrase; and
determining whether one entity from the plurality of entities is a topical entity that represents a predominant topic of the resource, wherein the determining comprises:
generating respective search queries for each of the identified entities;
obtaining, from a search engine, respective search results responsive to each of the generated search queries, wherein each search result has a respective ranking score;
determining that a search result referencing the particular web resource appears above a specified rank in a ranking of the search results responsive to at least one generated search query for at least one entity; and
in response to determining that a search result referencing the particular web resource appears above a specified rank in the ranking of the search results responsive to at least one generated search query for at least one entity:
if the particular web resource appears above a specified rank in the ranking of the search results responsive to the generated search query for exactly one entity, designating the one entity as the topical entity; and
if a search result referencing the particular web resource appears above a specified rank in the ranking of multiple search results responsive to multiple generated search queries, each search query and responsive results associated with more than one entity, designating one entity that generated a search result with a highest ranking score, among the multiple search results referencing the particular web resource, as the topical entity for the particular web resource.

2. The method of claim 1, further comprising:
associating additional content with the particular web resource.

3. The method of claim 2, wherein associating additional content with the particular web resource comprises:
increasing ranking scores of one or more highest scoring search results that were responsive to the search query generated from the topical entity;
selecting at least one web resource referenced by a particular search result having an increased ranking score that was responsive to the search query generated from the topical entity; and
associating content from the selected web resource with the particular web resource for the presentation to a user who subsequently requests the particular web resource.

4. A computer-implemented method comprising:
identifying a topical entity for a particular web resource, comprising:
identifying multiple entities that are associated with the particular web resource, each entity being a word or a phrase;
generating respective search queries for each of the identified entities;

obtaining, from a search engine, respective search results responsive to each of the generated search queries, wherein each search result has a respective ranking score;

determining that, in multiple different search result sets responsive to respective different search queries generated from the entities associated with the particular web resource, at least one search result references the particular web resource within a threshold number of top-ranked search results, wherein the search result is responsive to a search query generated for a particular entity associated with the particular web resource;

in response to determining that, in multiple different search result sets responsive to respective search queries generated from the entities associated with the particular web resource, a single search result references the particular web resource within the threshold number of top-ranked search results, wherein the search result is responsive to a search query generated for a particular entity associated with the particular web resource, designating the particular entity as the topical entity for the particular web resource; and in response to determining that, in multiple different search result sets responsive to respective search queries generated from the entities associated with the particular web resource, a respective search result references the particular web resource within the threshold number of top-ranked search results, wherein the respective search result is responsive to the respective one of multiple search queries, each generated for a respective entity associated with the particular web resource, designating one entity that generated a search result with a highest ranking score, among the multiple search results referencing the particular web resource, as the topical entity for the particular web resource.

5. The method of claim 4, further comprising:
receiving an indication that a user has requested the particular web resource; and
in response to the indication, providing the content from the selected one or more web resources associated with the particular web resource for presentation to the user along with the particular web resource.

6. The method of claim 4, further comprising:
associating additional content with the particular web resource.

7. The method of claim 6, wherein associating additional content with the particular web resource comprises:
increasing ranking scores of one or more highest scoring search results that were responsive to the search query generated from the topical entity;
selecting at least one web resource referenced by a particular search result having an increased ranking score that was responsive to the search query generated from the topical entity; and
associating content from the selected web resource with the particular web resource for the presentation to a user who subsequently requests the particular web resource.

8. A computer-implemented method for associating content comprising:
identifying a topical entity for a particular web resource, comprising:
identifying multiple entities that are associated with the particular web resource, each entity being a word or a phrase;
generating respective search queries for each of the identified entities,
obtaining, from a search engine, respective search results responsive to each of the generated search queries, wherein each search result has a respective ranking score,
determining that search results responsive to a search query generated from a particular entity include a particular type of search result;
determining that the particular entity occurs in a title or a resource locator of the particular web resource;
in response to determining that the search results responsive to the search query generated from the particular entity include the particular type of search result and that the particular entity occurs in the title or the resource locator of the particular web resource, designating the particular entity as a topical entity of the particular web resource; and
in response to determining that, in multiple different search result sets responsive to respective search queries generated from the entities associated with the particular web resource, multiple search results reference the particular web resource within the threshold number of top-ranked search results, wherein the web resource is responsive to multiple search queries, each generated for a particular entity associated with the particular web resource, designating one entity that generated a search result with a highest ranking score, among the multiple search results referencing the particular web resource, as the topical entity for the particular web resource.

9. The method of claim 8, wherein the particular type of search result is one of: shopping results, map results, or an answer box.

10. The method of claim 8, further comprising:
receiving an indication that a user has requested a particular web resource; and
in response to the indication, providing the content from the selected one or more web resources associated with the particular web resource for presentation to the user along with the particular web resource.

11. The method of claim 8, further comprising:
associating additional content with the particular web resource.

12. The method of claim 11, wherein associating additional content with the particular web resource comprises:
increasing ranking scores of one or more highest scoring search results that were responsive to the search query generated from the topical entity;
selecting at least one web resource referenced by a particular search result having an increased ranking score that was responsive to the search query generated from the topical entity; and
associating content from the selected web resource with the particular web resource for the presentation to a user who subsequently requests the particular web resource.

* * * * *